(12) United States Patent
Spangler et al.

(10) Patent No.: US 8,583,891 B1
(45) Date of Patent: Nov. 12, 2013

(54) ASSOCIATING PARTITIONS IN A COMPUTING DEVICE

(75) Inventors: Randall R. Spangler, San Jose, CA (US); William A. Drewry, Nashville, TN (US); William F. Richardson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 13/189,783

(22) Filed: Jul. 25, 2011

(51) Int. Cl.
*G06F 12/02* (2006.01)
(52) U.S. Cl.
USPC .......................................................... 711/173
(58) Field of Classification Search
None
See application file for complete search history.

(56) References Cited

U.S. PATENT DOCUMENTS

2008/0168258 A1* 7/2008 Armstrong et al. ............. 712/43

OTHER PUBLICATIONS

"Disk Format", The Chromium Projects, retrieved on Jul. 25, 2011 from http://www.chromium.org/chromium-os/chromiumos-design-docs/disk-format, 12 pages.

"How to Boot Ubuntu on a Cr-48", The Chromium Projects, retrieved on Jul. 25, 2011 from https://sites.google.com/a/chromium.org/dev/chromium-os/developer-information-for-chrome-os-devices/cr-48-chrome-notebook-developer-information/how-to-boot-ubuntu-on-a-cr-48, 11 pages.

"Root Filesystem Definition", The Linux Information Project, Copyright 2006, retrieved on Jul. 25, 2011 from http://www.linfo.org/root_filesystem.html, 1 page.

* cited by examiner

*Primary Examiner* — Duc Doan
(74) *Attorney, Agent, or Firm* — Brake Hughes Bellermann LLP

(57) ABSTRACT

Methods and apparatus for associating partitions in a computing device are disclosed. An example method includes, loading an operating system (O/S) kernel partition (kernel partition) and identifying one or more root filesystem (rootfs) partitions that are compatible with the loaded kernel partition. In the example method, the one or more compatible rootfs partitions are identified by comparing a set of compatibility bits of the loaded kernel partition with respective sets of compatibility bits of a plurality of rootfs partitions of the computing device. The example method still further includes selecting a rootfs partition from the one or more identified compatible rootfs partitions and loading the selected rootfs partition.

26 Claims, 9 Drawing Sheets

510

| PARTITION | TYPE | GUID | | DESCRIPTION | |
|---|---|---|---|---|---|
| 1 | kernel | RANDOM BITS | 531246 | kernel | 512 |
| 2 | rootfs | RANDOM BITS | XX1246 | rootfs_a | 514 |
| 3 | rootfs | RANDOM BITS | X31246 | rootfs_b | 516 |
| 4 | swap | RANDOM BITS | XX1246 | swap | 518 |

520

| PARTITION | TYPE | GUID | | DESCRIPTION | |
|---|---|---|---|---|---|
| 1 | rootfs | RANDOM BITS | 531246 | rootfs_c | 522 |
| 2 | custom | RANDOM BITS | XX1246 | OEM CUSTOMIZATION | 524 |
| 3 | state | RANDOM BITS | X31246 | USER STATE | 526 |

COMPUTING DEVICE 500

| PARTITION | TYPE | GUID | | DESCRIPTION | |
|---|---|---|---|---|---|
| 1 | kernel | RANDOM BITS | 4321 | kernel_a | 602 |
| 2 | kernel | RANDOM BITS | 4321 | kernel_b | 604 |
| 3 | kernel | RANDOM BITS | 4321 | kernel_c | 606 |
| 4 | rootfs | RANDOM BITS | 4321 | rootfs | 608 |

| PARTITION | TYPE | GUID | | DESCRIPTION | |
|---|---|---|---|---|---|
| 1 | kernel | RANDOM BITS | 5731 | kernel_a | 702 |
| 2 | kernel | RANDOM BITS | 5731 | kernel_b | 704 |
| 3 | rootfs | RANDOM BITS | 5731 | rootfs_a | 706 |
| 4 | rootfs | RANDOM BITS | 5731 | rootfs_b | 708 |

FIG. 7

ASSOCIATING PARTITIONS IN A COMPUTING DEVICE

TECHNICAL FIELD

This document relates, generally, to associating storage device partitions in a computing device.

BACKGROUND

Computing devices, such as personal computers, laptop computers, netbook computers and other types of computing devices, use operating systems to manage resources of the computing device and provide access to common services of the computing device. For example, an operating system may provide access to persistent storage devices, audio devices and video devices, among other system devices and system resources. Such operating systems are implemented using software that may include programs and data for carrying out the functions of the operating system. Two common components of computing device operating systems are an operating system kernel and a root filesystem (rootfs).

The kernel acts as a bridge between software applications (e.g., applications that are run by a user of the computing device and are not components of the operating system) and the actual data processing for those applications that is performed at the hardware level of the computing device (e.g., by a processor and/or other hardware components). The rootfs is the base filesystem for the computing device. The rootfs includes files that are used to boot (start up) a given computing device and to place the computing device in a state that allows additional filesystems to be loaded (mounted) on the rootfs. For purposes of this disclosure, the terms load and mount (and their variants) are used interchangeably. The particular elements of a computing system's kernel and rootfs will depend on the particular embodiment (e.g., the particular computing device and/or the particular operating system that is implemented).

In some embodiments, the kernel and rootfs for a computing device are included in a single partition (e.g., an operating system partition) of a storage device of the computing device. In such an approach, identifying information for the operating system partition is included in an entry of a corresponding partition table of the storage device that contains the operating system partition. In other embodiments, a kernel may be included in a first partition (e.g., a kernel partition), while a corresponding rootfs may be included in a second partition (e.g., a rootfs partition). In such embodiments, a partition table entry for the kernel partition is followed immediately (in a corresponding partition table) by a partition table entry for the rootfs partition that is associated with the kernel partition. These approaches have limited flexibility as kernels and root filesystems (rootfses) are necessarily linked in one-to-one relationships.

SUMMARY

In one general aspect, a computer-implemented method includes loading, by a computing device, an operating system (O/S) kernel partition (kernel partition) and identifying, by the computing device, one or more root filesystem (rootfs) partitions that are compatible with the loaded kernel partition. The one or more compatible rootfs partitions are identified by comparing a set of compatibility bits of the loaded kernel partition with respective sets of compatibility bits of a plurality of rootfs partitions of the computing device. The computer-implemented method also includes selecting a rootfs partition from the one or more identified compatible rootfs partitions and loading, by the computing device, the selected rootfs partition.

Implementations may include one or more of the following features. For example, each of the respective sets of compatibility bits of the loaded kernel partition and the plurality of rootfs partitions may include a predefined subset of bits of respective global unique identifiers (GUIDs) of the loaded kernel partition and the plurality of rootfs partitions, where locations of the compatibility bits are common for each of the GUIDs. Each of the sets of compatibility bits may include one of a set of contiguous bits of the respective GUID and a set of interleaved bits of the respective GUID. Each of the sets of compatibility bits may include one of a set of contiguous bits beginning at, and including a most significant bit of the respective GUID; a set of contiguous bits ending at, and including a least significant bit of the respective GUID; and a set of contiguous bits that does not include the most significant bit or the least significant bit of the respective GUID.

Each of the respective sets of compatibility bits of the loaded kernel partition and the plurality of rootfs partitions may be included in respective attribute fields of respective partition table entries for the loaded kernel partition and the plurality of rootfs partitions. Each of the respective sets of compatibility bits of the loaded kernel partition and the plurality of rootfs partitions may be included in respective compatibility bits fields of respective partition table entries for the loaded kernel partition and the plurality of rootfs partitions.

Loading the kernel partition may include selecting the loaded kernel partition from a plurality of kernel partitions of the computing device. Each of the plurality of kernel partitions may be identified by a respective partition table entry. Each respective partition table entry may be included in a respective partition table of one or more partition tables of the computing device. Selecting the loaded kernel partition may include identifying the loaded kernel partition in firmware of the computing device. Selecting the loaded kernel partition may include selecting the loaded kernel partition based on a user selection.

The loaded kernel partition and the selected rootfs partition may be listed non-sequentially in a partition table of a storage device included in the computing device. The loaded kernel partition and the selected rootfs partition may be respectively located on and listed in respective partition tables of a first storage device included in the computing device and a second storage device included in the computing device.

The computer-implemented method may further include identifying, by the computing device, one or more other partitions that are compatible with the loaded kernel partition by comparing the compatibility bits of the loaded kernel partition with respective compatibility bits of the one or more other partitions; selecting at least one of the one or more other partitions; and loading, by the computing device, the selected at least one of the one or more other partitions. The one or more other partitions may include at least one of a swap partition, a user state partition and a customization partition.

Selecting the selected rootfs partition may include selecting a rootfs partition having a highest number of its compatibility bits in common with the compatibility bits of the loaded kernel partition. Selecting the selected rootfs partition may include selecting a rootfs partition based on a proximity of a partition table entry for the selected rootfs to a partition table entry for the loaded kernel partition in a corresponding partition table.

In another general aspect, a computing device includes a first storage device, the first storage device having a first partition table stored thereon, the first partition table including a plurality of entries, each entry of the first partition table corresponding to a respective partition of the first storage device, each partition table entry of the first partition table including a set of compatibility bits for its respective partition, the respective compatibility bits indicating compatibility relationships between the respective partitions. The compatibility relationships include at least one of a one-to-many relationship between an operating system kernel partition (kernel partition) and a first plurality of root filesystem (rootfs) partitions; a many-to-many relationship between a first plurality of kernel partitions and a second plurality of rootfs partitions; and a many-to-one relationship between a second plurality of kernel partitions and a rootfs partition.

Implementations may include one or more of the following features. For example, the compatibility relationships may further include at least one of a relationship between one of the kernel partitions and a swap partition; a relationship between one of the kernel partitions and a user state partition; and a relationship between one of the kernel partitions and a customization partition. The compatibility bits for each partition may be included in a global unique identifier included in each respective partition table entry.

The computing device may further include a second storage device. The second storage device may have a second partition table stored thereon. The second partition table may include a plurality of entries, where each entry of the second partition table may correspond to a respective partition of the second storage device. Each partition table entry of the second partition table may include a set of compatibility bits for its respective partition. The respective compatibility bits of the second partition table may indicate at least one of a compatibility relationship between a rootfs partition of the second storage device and a kernel partition of the first storage device and a compatibility relationship between a kernel partition of the second storage device and a rootfs partition of the first storage device.

In another general aspect, a computer-implemented method includes receiving, at a partition creator of a computing device, a request to create a partition on a storage device of the computing device and determining whether the partition is to be compatible with an existing partition group of the computing device. If the partition is to be compatible with an existing partition group of the computing device, the computer-implemented method includes assigning a globally unique identifier (GUID) for the partition that includes a set of compatibility bits corresponding with the existing partition group. If the partition is not to be compatible with an existing partition group of the computing device, the computer implemented method includes assigning a GUID for the partition that includes a set of compatibility bits that are different than respective compatibility bits for existing partition groups of the computing device. The computer-implemented method also includes creating a partition table entry for the partition, the partition table entry including the assigned GUID.

Implementations may include one or more of the following features. For example, the request to create the partition may be a request to create the partition on one of a first storage device of the computing system and a second storage device of the computing system. The request to create the partition may be a request to create one of an operating system kernel partition, a root filesystem partition, a swap partition, a user state partition and a customization partition.

In another general aspect, a recordable storage medium has recorded and stored thereon instructions that, when executed, cause a computing device to load an operating system (O/S) kernel partition (kernel partition) and identify one or more root filesystem (rootfs) partitions that are compatible with the loaded kernel partition. The one or more compatible rootfs partitions are identified by comparing a set of compatibility bits of the loaded kernel partition with respective sets of compatibility bits of a plurality of rootfs partitions of the computing device. When executed, the instructions further cause the computing device to select a rootfs partition from the one or more identified compatible rootfs partitions and load the selected rootfs partition.

Implementations may include one or more of the following features. For example, the instructions, when executed, may cause the computing device to identify one or more other partitions that are compatible with the loaded kernel partition by comparing the compatibility bits of the loaded kernel partition with respective compatibility bits of the one or more other partitions, select at least one of the one or more other partitions; and load the selected at least one of the one or more other partitions.

In another general aspect, a recordable storage medium has recorded and stored thereon instructions that, when executed, cause a computing device to receive, at a partition creator of a computing device, a request to create a partition on a storage device of the computing device and determine whether the partition is to be compatible with an existing partition group of the computing device. If the partition is to be compatible with an existing partition group of the computing device, the instructions, when executed, cause the computing device to assign a globally unique identifier (GUID) for the partition that includes a set of compatibility bits corresponding with the existing partition group. If the partition is not to be compatible with an existing partition group of the computing device, the instructions, when executed, cause the computing device to assign a GUID for the partition that includes a set of compatibility bits that are different than respective compatibility bits for existing partition groups of the computing device. When executed, the instructions further cause the computing device to create a partition table entry for the partition, the partition table entry including the assigned GUID.

BRIEF DESCRIPTION OF THE DRAWINGS

FIG. 5 is a diagram illustrating partition tables of a computing device in accordance with an example embodiment.

FIG. 6 is a diagram illustrating a partition table in accordance with an example embodiment.

FIG. 7 is a diagram illustrating a partition table in accordance with an example embodiment.

DETAILED DESCRIPTION

Figure 1:
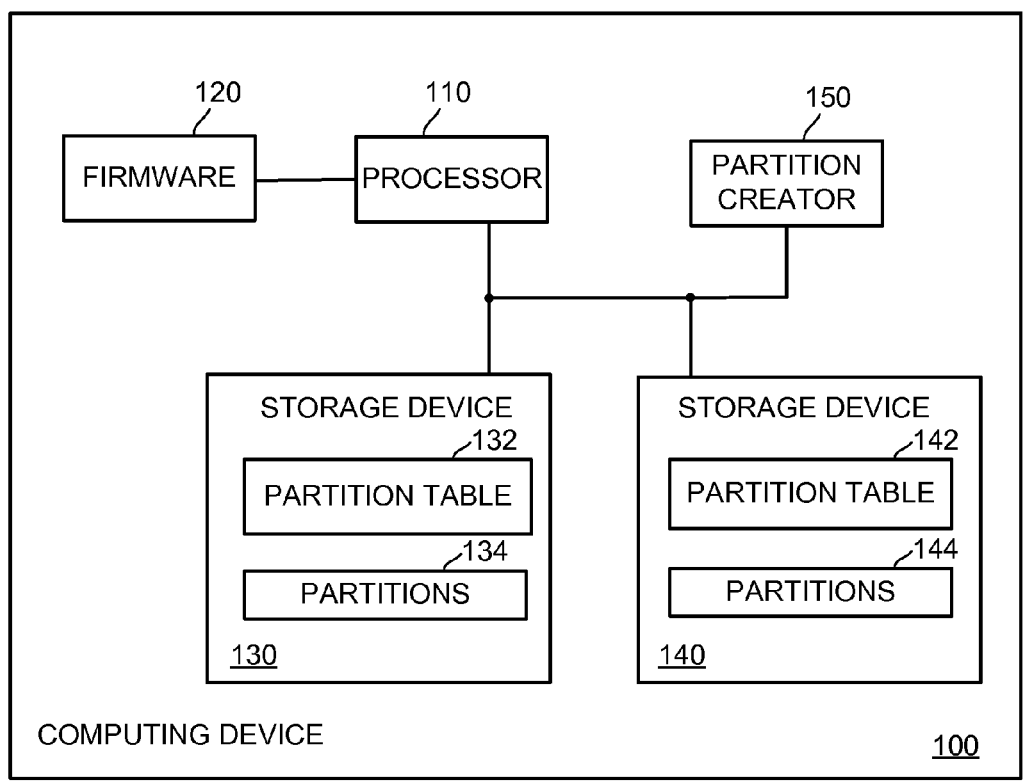
FIG. 1 is a block diagram illustrating a computing device in accordance with an example embodiment.

FIG. 1 is a block diagram illustrating a computing device 100 in accordance with an example embodiment. As shown in FIG. 1, the computing device 100 includes a processor 110, firmware 120, a first storage device 130, a second storage device 140 and a partition creator 150. In the computing device 100, the processor 110 may be configured to execute machine readable instructions that are stored in various components of the computing device 100. For instance, such instructions may be stored in the firmware 120, the storage device 130 and/or the storage device 140. In an example embodiment, the partition creator 150 may be implemented using a set of machine readable instructions that, when executed by the processor 110, may cause the computing device 100 to implement a method for creating a storage device partition, such as in accordance with the approaches described herein. While the partition creator 150 is shown as a separate component in FIG. 1, it will be appreciated that the partition creator 150 could be integrated with another component of the computing system 100, such as the storage device 130 or the storage device 140, for example.

In one embodiment, the firmware 120 may include machine readable instructions that, when executed by the processor 110, are configured to implement an initial portion of a boot (e.g., start-up) process for the computing device 100. For instance, the firmware 120 may include instructions that, when executed, initialize basic operations of the computing device 100. In an example embodiment, the instructions included in the firmware 120, when executed, may place the computing device 100 in an appropriate state to load an operating system kernel partition (kernel partition).

In one embodiment, the kernel partition that is to be loaded by the computing device 100 may be specifically indicated in the firmware 120. In another embodiment, the kernel partition that is to be loaded by the computing device 100 may be based on a user selection using, for example, a menu, such as the menu illustrated in FIG. 2 and discussed below. In certain embodiments, the firmware 120 may also include instructions that, when executed, may be used to verify the kernel partition that is to be loaded. Such verification may be accomplished using a digital signature corresponding with (and included in) the kernel partition that is to be loaded and a public encryption key (e.g., included in the firmware 120), where the public encryption key corresponds with a private encryption key that was used to generate the digital signature.

As illustrated in FIG. 1, the storage device 130 includes a partition table 132 and one or more partitions 134. The partitions 134 may include one or more kernel partitions, one or more rootfs partitions and one or more other types of partitions, where each partition of the partitions 134 has a corresponding entry in the partition table 132. In example embodiments, the other types of partitions may include, as some examples, swap partitions, user state partitions and customization partitions. Swap partitions may, for example, be used as overflow storage for system memory (e.g., dynamic RAM). User state partitions may be used to store user specific information, such as browser history, browser caches and other use-related information corresponding with one or more users of the computing device 100. Customization partitions may be used to store customization information, such as operating system customization, that may be provided by a manufacturer of the computing device 100.

In the computing device 100, the storage device 140 also includes a partition table 142 and one or more partitions 144. In like fashion as the storage device 130, the partitions 142 may include one or more kernel partitions, one or more rootfs partitions and one or more other types of partitions, where each partition of the partitions 144 has a corresponding entry in the partition table 142. Using the techniques described herein, the partition table entries in the partitions tables 132 and 142 may be used to indicate which partitions of the partitions 134 and the partitions 144 are compatible with each other. Using these approaches, a number of different compatibility relationships may be defined. For instance, as is discussed in further detail below, one-to-many, many-to-one and many-to-many relationships may be defined using the partition tables 132 and/or 142.

In an example embodiment of a one-to-many relationship, a single kernel partition may be indicated as being compatible with a plurality of rootfs partitions, such as illustrated in FIG. 5. As an example of a many-to-one relationship, a plurality of kernel partitions may be indicated as being compatible with a single rootfs partition, as illustrated in FIG. 6. And, as an example of a many-to-many relationship, a plurality of kernel partitions may be indicated as being compatible with a plurality of rootfs partitions, as illustrated in FIG. 7. The entries of the partition table 132 and 142 may also be used to indicate similar relationships between kernel partitions and other types of partitions, such as those descried herein.

Using the techniques described herein provides greater flexibility than previous approaches, as the relationships between partitions (e.g., kernel partitions, rootfs partitions and other partitions) are not fixed. These techniques allow a computing device to be operated using different combinations of compatible partitions rather than being limited to fixed relationships. For example, if a given kernel partition is compatible with multiple rootfs partitions and one of those rootfs partitions becomes corrupted, the computing device 100 may be configured to select another compatible rootfs partition. Such an approach would allow the computing system 100 to operate properly, even though corruption has occurred in one of its rootfs partitions. In approaches where there is a single operating system partition (including a kernel and a rootfs), or a fixed relationship between a kernel partition and a single rootfs partition, such corruption may prevent an associated computing system from operating properly (e.g., the computing system may fail to boot).

In an embodiment where multiple kernel partitions are compatible with a single rootfs system, different kernels may share a rootfs. Because kernel partitions may be relatively small compared to rootfs partitions, such an approach may reduce an amount of storage space used as compared to embodiments where each kernel has a dedicated rootfs (e.g., in separate operating system partitions or with fixed relationships between each kernel partition and corresponding rootfs partitions). The benefits of embodiments where a given kernel partition is compatible with multiple rootfs partitions and the benefits of embodiments where multiple kernel partitions are compatible with a single rootfs system may both be realized in embodiments where multiple kernel partitions are compatible with multiple rootfs partitions (e.g., an embodiment where three kernel partitions are compatible with two rootfs partitions).

Figure 2:
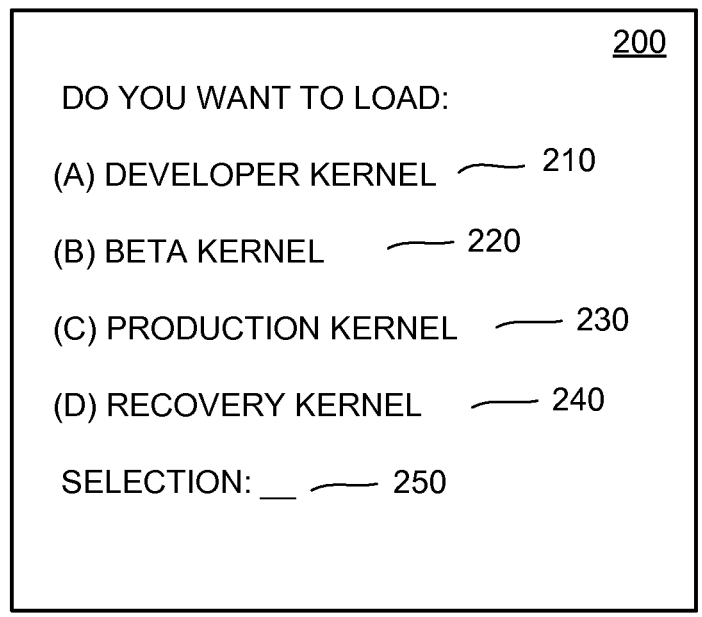
FIG. 2 is a diagram illustrating a menu for selecting an operating system kernel partition to load on a computing device in accordance with an example embodiment.

FIG. 2 is a diagram illustrating a menu 200 that may be used to select an operating system kernel partition that is to be loaded on a computing device in accordance with an example embodiment. The menu 200 may be implemented using the computing device 100 shown in FIG. 1, though the menu 200 may be implemented in other computing device configurations. For purposes of illustration, the menu 200 will be described with further reference to FIG. 1.

In an example embodiment, the menu 200 may be presented to a user on a display of the computing device 100. For instance, the menu 200 may be presented as a result of executing machine readable instructions that are included in the firmware 120 of the computing device 100. Those instruction may be configured to, when executed, examine the partition tables 132 and 142 to identify available operating kernel partitions and, then display a list of options 210, 220, 230 and 240 that correspond with the identified kernel partitions.

For instance, in this example, the computing device 100 (e.g., in the partitions 134 and 144) may include four kernel partitions, e.g., a developer kernel partition (option 210), a beta kernel partition (option 220), a production kernel partition (option 230) and a recovery kernel partition (option 240). The developer kernel may be a kernel that implements various debug hooks for use during system development, a beta kernel may be an early release of a kernel that is scheduled for commercial release, the production kernel may be a most recently, commercially released kernel and a recovery kernel may be a kernel that is used to restore a computing device to a known, safe state (e.g., after a system failure or corruption of the operating system).

The user may provide a selection using a selection option 250, e.g., via a keyboard entry. Alternatively, the user could select his or her desired option using a pointing device and selecting the line corresponding with the desired option. Once the user makes a selection, the computing device 100 may then proceed to load the selected kernel partition. After loading the selected kernel partition, the computing device 100 may execute instructions included in the loaded kernel that are configured to identify one or more rootfs partitions that are compatible with the loaded kernel. The loaded kernel may also include instructions that are configured to, when executed and if appropriate (i.e., more than one compatible rootfs partition is identified), select one of the compatible partitions to be loaded (mounted) on the computing device 100. Such identification and selection of compatible rootfs partitions may be performed using the techniques described herein.

Figure 3A:
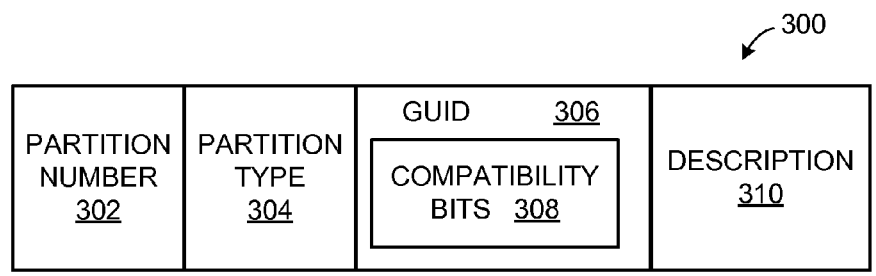
FIGS. 3A, 3B and 3C are diagrams illustrating partition table entry formats including compatibility bits in accordance with example embodiments.
Figure 3B:
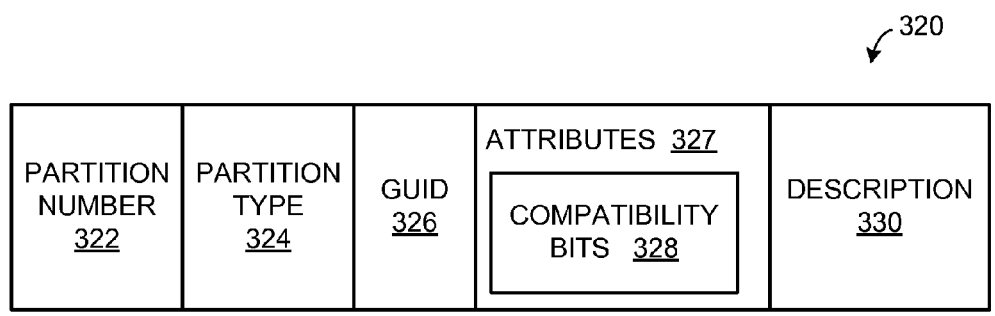
Figure 3C:
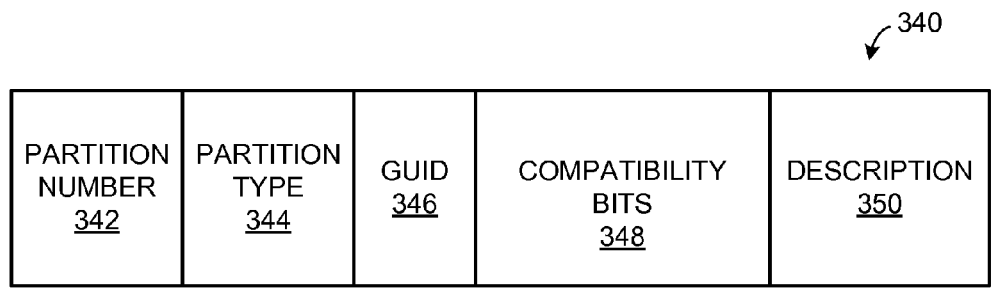

FIGS. 3A, 3B and 3C are diagrams that illustrate partition table entry formats diagrams 300, 320 and 340 that include compatibility bits in accordance with example embodiments. Each of the partition table entry formats 300, 320 and 340 may be used, for example, to respectively identify each of the partitions of the partitions 134 and 144 in their respective partition tables 132 and 142 in the computing device 100 shown in FIG. 1. Of course, a number of other partition table entry formats are possible.

FIG. 3A is a diagram illustrating a partition table entry format 300. As illustrated, the partition table entry format 300 includes a partition number field 302, a partition type field 304, a globally unique identifier (GUID) field 306 and a description field 310.

The partition number field 302 may include an integer designator indicating a sequential partition number for a corresponding partition. For instance, the partition number fields 302 for a given partition table may be numbered sequentially starting at '1', with each successive partition table entry 300 (row) of the corresponding partition table having a partition number field 302 that is incremented by '1' over the previous entry.

The partition type field 304 may be used to indicate the type of partition that corresponds with the given entry. For example, the partition type field 304 may designate a corresponding partition as a "kernel" partition, a "rootfs" partition, a "swap" partition, a user "state" partition, or a "custom" (customization) partition, as some examples.

The description field 310 may include a narrative description of the partition that corresponds with the particular partition table entry. As an example, the description field 310 may be used to store narrative information for kernel partitions, which may then be used when presenting the menu 200 (or a similar menu) to a user for selecting a kernel partition to load, such as was discussed above with respect to FIG. 2.

The partition table entry formats 320 and 340 that are shown, respectively, in FIG. 3B and FIG. 3C, also include partition number fields 322 and 342, respectively; partition type fields 324 and 344, respectively; and description fields 330 and 350, respectively. These fields, in the partition table entry formats 320 and 340, may be used in like fashion as discussed with respect to their corresponding fields in the partition table entry format 300. Therefore, for purposes of brevity, those fields will not be described again in detail with respect to the partition table entry formats 320 and 340.

As is also shown in FIGS. 3A-3C, each of the partition table entry formats 300, 320 and 340 includes a set of compatibility bits 308, 328 and 348, respectively. The compatibility bits 308, 328 and 348 may be used to indicate compatibility relationships between different partitions. As is described herein, such compatibility relationships may be defined for partitions listed in a single partition table (i.e., for partitions on a single storage device) or may be defined for partitions listed in multiple partition tables (i.e., for partitions across multiple storage devices).

In the partition table entry format 300 illustrated in FIG. 3A, the compatibility bits 308 are included in a global unique identifier (GUID) field 306. In such approaches, the compatibility bits may be a subset of bits included in the GUID field 306, where the other bits of the GUID field 306 may be a randomly generated set of bits that are used to "globally" and uniquely identify a corresponding partition in an associated computing device, such as the computing device 100. In an example embodiment, the GUID field 306 may include 128 bits, where the compatibility bits 308 are a subset of the 128 bits. For example, the compatibility bits 308 may, in one embodiment, include 16 bits (i.e., four hexadecimal digits). In another embodiment, the compatibility bits 308 may include 20 bits (i.e., five hexadecimal digits).

In certain embodiments, compatibility between partitions may be indicated when a subset of the compatibility bits 308 match a corresponding subset of compatibility bits 308 of another partition. For instance, in an embodiment where the compatibility bits 308 of a partition table entry include five hexadecimal digits, compatibility with other partitions may be established if four of the five corresponding hexadecimal digits of two given partition table entries (e.g., a kernel partition table entry and a rootfs partition table entry) match. In such an approach, matching additional bits (or hexadecimal digits) of the respective compatibility bits 308 of two partition table entries may be used to indicate that one compatible partition is preferred over another compatible partition.

For instance, in an example embodiment, if a partition table entry for a given kernel partition includes five hexadecimal digits of "A9B8C" in its compatibility bits 308, a partition table entry for a first rootfs partition that has compatibility bits 309 of "59B8C" may be determined to be compatible with the kernel partition based on the last four hexadecimal digits (i.e., "9B8C") of the respective compatibility bits 308 matching. However, a second rootfs partition that has compatibility bits 308 of "A9B8C" may be determined to not only be compatible with the kernel partition, but to be preferred over the first rootfs partition based on all five of the hexadecimal digits of the respective compatibility bits 308 matching.

As is shown in FIG. 3B, the compatibility bits 328 may be a subset of bits of a partition attributes field 327 included in a partition table entry having the partition table entry format 320. In the partition table entry format 340 shown in FIG. 3C, the compatibility bits 348 are included in a dedicated field. It will be appreciated that the compatibility bits 328 and 348 may be used in similar fashions as the compatibility bits 328 to determine compatibility and/or partition preferences. Further, the compatibility bits 308, 328 and 348 may be implemented in a number of different fashions, such as those described herein.

FIGS. 4A, 4B, 4C and 4D are diagrams illustrating GUID fields 400, 410, 420 and 430 that include compatibility bits 402, 412, 422 and 432, respectively, in accordance with example embodiments. For instance, FIGS. 4A, 4B, 4C and 4D illustrate a number of alternative approaches for including compatibility bits in a GUID field. Accordingly, in certain embodiments, the GUID fields 400, 410, 420 and 430 may be implemented as the GUID field 306 in the partition table entry format 300 shown in FIG. 3A.

Figure 4A:
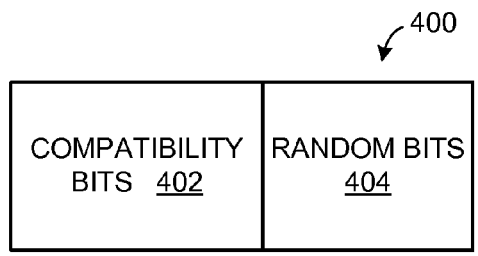
FIGS. 4A, 4B, 4C and 4D are diagrams illustrating global unique identifier formats including compatibility bits in accordance with example embodiments.
Figure 4B:
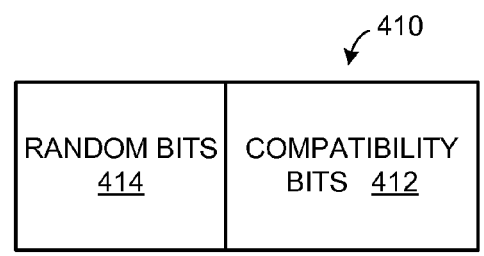
Figure 4C:
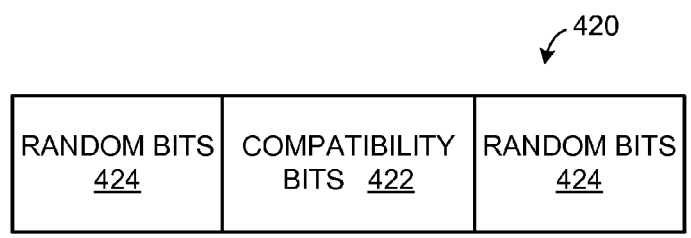

As shown in FIG. 4A, the compatibility bits 402 may comprise a set of contiguous bits that begin at, and include the most significant bit of the GUID field 400. The GUID field 400 also includes random bits 404, which may be used to globally, and uniquely identify an associated partition in a computing device, such as previously discussed. As shown in FIG. 4B, the compatibility bits 412 may comprise a set of contiguous bits that end at, and include the least significant bit of the GUID field 410. In like fashion as the GUID field 400, the GUID field 410 includes random bits 414, which may be used to globally, and uniquely identify an associated partition in a computing device. As shown in FIG. 4C, the compatibility bits 422 may comprise a set of contiguous bits that does not include the most significant bit or the least significant bit of the GUID field 420. In like fashion as the GUID fields 400 and 410, the GUID field 420 includes random bits 424, which may be used to globally, and uniquely identify an associated partition in a computing device. Using contiguous bits for compatibility bits, such as shown in FIGS. 4A-4C may allow compatible partitions to be easily identified by manual review of the partition table or tables of a given computing device, which are typically viewable in text format.

Figure 4D:
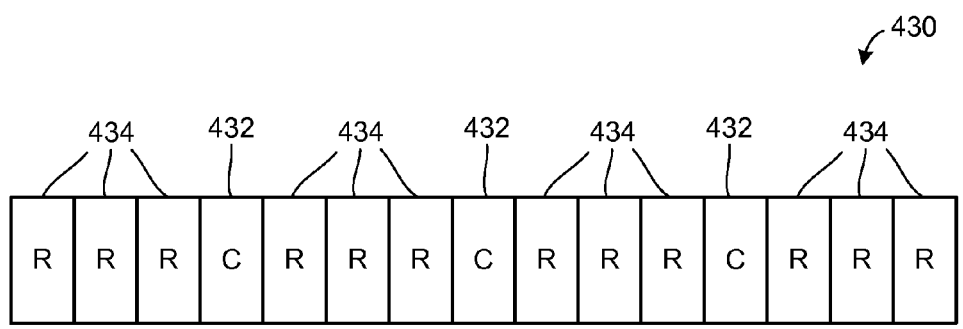

Alternatively to the approaches using contiguous bits shown in FIGS. 4A-4C, as shown in FIG. 4D, the compatibility bits 432 may be interleaved with random bits 434 of the GUID field 430. As with the GUID fields 400, 410 and 420, the compatibility bits 432 may be used to indicate compatibility between partitions (e.g., using the techniques described herein), while the random bits 434 may be used to globally, and uniquely identify an associated partition in a computing device.

FIG. 5 is a diagram illustrating partition tables 510 and 520 of a computing device 500 in accordance with an example embodiment. The embodiment illustrated in FIG. 5 illustrates an example of a one-to-many compatibility relationship between a kernel partition (entry 512) and multiple rootfs partitions (entries 514, 516 and 522). In the embodiment illustrated in FIG. 5, the partition table 510 may be a partition table of a first storage device of the computing device 500, while the partition table 520 may be a partition table of a second storage device of the computing device 500.

As shown in FIG. 5, the partition table 510 includes entries 512, 514, 516 and 518; and the partition table 520 includes entries 522, 524 and 526. For purpose of illustration, the partition tables 510 and 520 only show entries for compatible partitions. It will be appreciated, however, that the partition tables 510 and 520 may include additional entries corresponding with other storage device partitions that are not compatible with those shown in FIG. 5. Each entry of the partition tables 510 and 520 takes the form of the partition table entry format 300 shown in FIG. 3C, and also includes a GUID field 306 in the form of the GUID field 410 shown in FIG. 4B. In other embodiments, partition table entries may take other forms.

For purposes of brevity, the individual fields of the entries of the partition tables 510 and 520 will not be described in detail with respect to FIG. 5. Those individual fields will, however, be discussed, as is appropriate to the following description of FIG. 5.

The entry 512 of the partition table 510 corresponds with a kernel partition, where the compatibility bits of the kernel partition included in the entry 512 are "531246." For the remaining entries of the partition table 510, and the entries of the partition table 520, an "X" in the compatibility bits portion of the GUID field indicates a non-matching digit with the compatibility bits of the kernel partition of the entry 512. The entry 514 of the partition table 510 corresponds with a rootfs partition ("rootfs_a"), where the compatibility bits of the rootfs_a partition included in the entry 514 are "X31246." The entry 516 of the partition table 510 corresponds with a rootfs partition ("rootfs_b"), where the compatibility bits of the rootfs_b partition included in the entry 516 are "XX31246." The entry 518 of the partition table 510 corresponds with a swap partition, where the compatibility bits of the swap partition included in the entry 518 are "XX1246."

In similar fashion as the entries of the partition table 510, the entry 522 of the partition table 520 corresponds with a rootfs partition ("rootfs_c"), where the compatibility bits of the rootfs_b partition included in the entry 522 are "531246." The entry 524 of the partition table 520 corresponds with an OEM customization partition, where the compatibility bits of the OEM customization partition included in the entry 524 are "XX1246." The entry 526 of the partition table 520 corresponds with a user state partition, where the compatibility bits of the user state partition included in the entry 518 are "X31246."

As was previously discussed, a subset of the compatibility bits for the partitions listed in the partition tables 510 and 520 may be used to indicate compatibility between partitions, where matching additional bits (or digits) may indicate preference of one compatible partition over another compatible partition with fewer matching compatibility bits (or digits). For instance, if compatibility of the partitions corresponding with the entries of the partition tables 510 and 520 is indicated by at least four digits of their corresponding compatibility bits matching, such an arrangement would result in all of the partitions listed in the partition tables 510 and 520 being indicated as being compatible, when they are used in appropriate combinations. For example, the kernel partition of the entry 512, in a given embodiment, could be used in conjunction with one of the rootfs partitions of the entries 514, 516 and 518. Further, the kernel partition of the entry 512 (and a selected rootfs partition) could be used in conjunction with the swap partition of the entry 518, the OEM customization partition of the entry 524 and/or the user state partition of the entry 526.

In such an approach, the rootfs_c partition of the entry 522 may be preferred over the rootfs_b partition of the entry 516 and the rootfs_a partition of the entry 514, because all six digits of the compatibility bits of the entry 522 match the compatibility bits of the kernel partition of the entry 512, while only five digits of the compatibility bits of the rootfs_b partition match and four digits of the compatibility bits of the rootfs_a partition match. Similarly, the rootfs_b partition of the entry 516 may be preferred over the rootfs_a partition of the entry 514.

In certain embodiments, selecting a compatible partition from a plurality of compatible partitions may be alternatively, or additionally, based on proximity of the partition table entries to one another in a corresponding partition table. For instance, if the rootfs_a partition of the entry 514, the rootfs_b partition of the entry 516 and the rootfs_c partition of the entry 522 all had an equivalent number of matching compatibility bits (or digits) with the kernel partition 512, the rootfs_a partition may be selected over the rootfs_b partition and the rootfs_c partition based on the proximity of the entry 512 to the entry 512 in the partition table 510. Similarly, the rootfs_b partition may be preferred over the rootfs_c partition due to the fact that is on the same storage device. Of course, other approaches may be used. For instance, preference may be given to a partition whose entry is the least proximate to a partition table entry for a compatible partition. As another alternative, a number of matching compatibility bits and proximity of partition table entries may be used in combination when selecting a compatible partition.

Using the techniques described herein, and as are illustrated in FIG. 5, compatible kernel and rootfs partitions of a computing device may be listed non-sequentially in a partition table, such as in the partition tables 510 and 520. Further compatible kernel and rootfs partitions may be located on separate storage devices, such as respective storage devices corresponding with the partition tables 510 and 520. Such an approach may allow a kernel partition (which may be relatively small compared to a rootfs partition) to be implemented on a faster, higher cost storage device (e.g., EEPROM), while a compatible rootfs partition is implemented on a somewhat slower, but lower cost storage device (e.g., a solid state drive or a rotational hard drive). The techniques described herein (and illustrated in FIG. 5) may also allow other types of partitions to be indicated as being compatible with a kernel partition and/or a rootfs partition regardless of whether or not they are present on the same drive as the kernel partition and/or the rootfs partition.

FIG. 6 is a diagram illustrating a partition table 600 in accordance with an example embodiment. The embodiment illustrated in FIG. 6 illustrates an example of a many-to-one compatibility relationship between multiple kernel partitions (entries 602, 604 and 606) and a rootfs partitions (entry 608). While the entries of the partition table 600 are shown as being included in a single partition table, it will be appreciated that those entries could be included in multiple partition tables, such as in similar fashion as illustrated in FIG. 5. In an example embodiment, the kernel partitions of the partition table 600 may correspond with different kernel types, such as in similar fashion as discussed above with respect to FIG. 2.

As shown in FIG. 6, the entry 602 corresponds with a kernel partition ("kernel_a"), the entry 604 corresponds with a kernel partition ("kernel_b"), the entry 606 corresponds with a kernel partition ("kernel_c") and the entry 608 corresponds with a rootfs partition. Each of the entries of the partition table 600 includes compatibility bits (digits) of "4321", which indicates that each of the kernel partitions corresponding with the entries 602, 604 and 606 is compatible with the rootfs partition corresponding with the entry 608.

FIG. 7 is a diagram illustrating a partition table 700 in accordance with an example embodiment. The embodiment illustrated in FIG. 7 illustrates an example of a many-to-many compatibility relationship between multiple kernel partitions (entries 702 and 704) and multiple rootfs partitions (entries 706 and 708). In like fashion as the partition table 600, while the entries of the partition table 700 are shown as being included in a single partition table, it will be appreciated that those entries could be included in multiple partition tables, such as in similar fashion as illustrated in FIG. 5. In an example embodiment, the kernel partitions of the partition table 700 may correspond with different kernel types, such as in similar fashion as discussed above with respect to FIG. 2.

As shown in FIG. 7, the entry 702 corresponds with a kernel partition ("kernel_a"), the entry 704 corresponds with a kernel partition ("kernel_b"), the entry 706 corresponds with a rootfs partition ("rootfs_a") and the entry 708 corresponds with a rootfs partition ("rootfs_b"). Each of the entries of the partition table 700 includes compatibility bits (digits) of "5731", which indicates that each of the kernel partitions corresponding with the entries 702 and 704 is compatible with each of the rootfs partitions corresponding with the entries 706 and 708. In such an arrangement, either of the kernel partitions (corresponding with the entry 702 or the entry 704) may be loaded and either of the rootfs partitions (corresponding with the entry 706 or the entry 706) may be selected and loaded (mounted) by the loaded kernel partition. The particular kernel partition and rootfs partition that are used may be selected using the techniques described herein.

Figure 8:
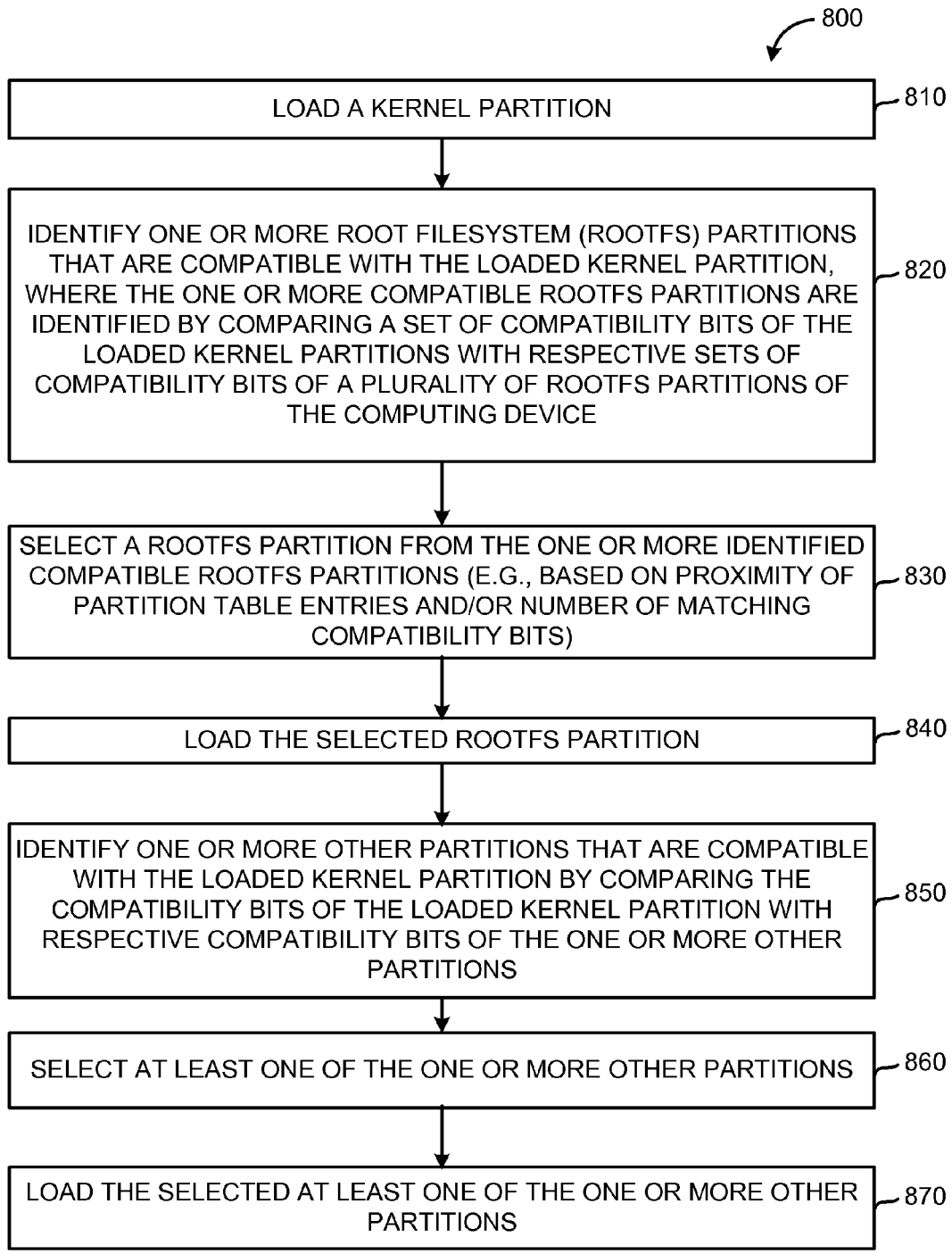
FIG. 8 is a flowchart illustrating a method for associating storage device partitions in accordance with an example embodiment.

FIG. 8 is a flowchart illustrating a computer-implemented method 800 for associating storage device partitions in accordance with an example embodiment. The method 800 may be implemented using the computing device 100 illustrated in FIG. 1, as well as using the techniques described herein. Depending on the particular embodiment, the method 800 may include additional operations or may eliminate one or more of the operations shown in FIG. 8.

The method 800 includes, at block 810, loading an operating system (O/S) kernel partition (kernel partition) on a computing device. The particular kernel partition that is loaded may be selected from a plurality of kernel partitions included on the computing device using, for example, the approaches described herein. The method 800 further includes, at block 820, identifying, (e.g., using machine readable instructions that are included in the loaded kernel partition), one or more root filesystem (rootfs) partitions that are compatible with the loaded kernel partition. As is described herein, the one or more compatible rootfs partitions may be identified by comparing a set of compatibility bits corresponding with the loaded kernel partition with respective sets of compatibility bits that correspond with a plurality of rootfs partitions of the computing device. At block 830, the method 800 includes selecting a rootfs partition from the one or more identified compatible rootfs partitions, such as using the techniques described above with respect to, for example, FIG. 5. At block 840, the method 800 includes loading (mounting) the selected rootfs partition.

At block 850, the method 800 includes identifying one or more other partitions (e.g., a swap partition, a user state partition and/or a customization partition) that are compatible with the loaded kernel partition (and the loaded rootfs partition) by comparing the compatibility bits of the loaded kernel partition with respective compatibility bits of the one or more other partitions. The method 800 further includes, at block 860, selecting at least one of the one or more other partitions and, at block 870, loading the selected at least one of the one or more other partitions.

Figure 9:
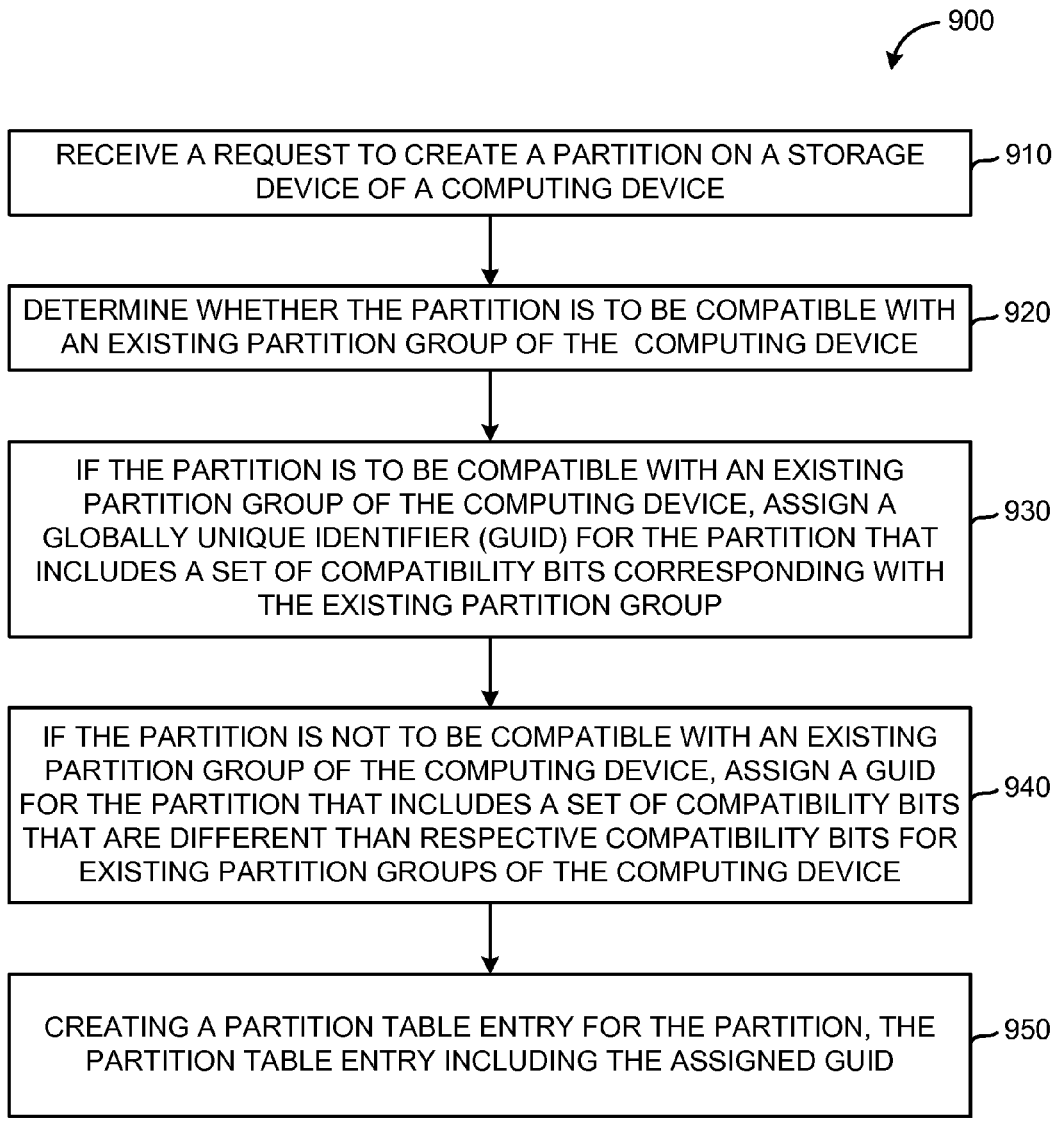
FIG. 9 is a flowchart illustrating a method for creating storage device partitions in accordance with an example embodiment.

FIG. 9 is a flowchart illustrating a method 900 for creating storage device partitions in accordance with an example embodiment. The method 900 may be implemented using the computing device 100 illustrated in FIG. 1, as well as using the techniques described herein. Depending on the particular embodiment, the method 900 may include additional operations or may eliminate one or more of the operations shown in FIG. 9.

The method 900 includes, at block 910 receiving, at a partition creator, a request to create a partition on a storage device of the computing device. At block 920, the method 900 includes determining whether the partition is to be compatible with an existing partition group of the computing device.

If the partition is to be compatible with an existing partition group of the computing device, the method 900 includes, at block 930, assigning a globally unique identifier (GUID) for the partition that includes a set of compatibility bits corresponding with the existing partition group. If the partition is not to be compatible with an existing partition group of the computing device, the method 900 includes, at block 940, assigning a GUID for the partition that includes a set of compatibility bits that are different than respective compatibility bits for existing partition groups of the computing device.

The method 900 further includes, at block 950, creating a partition table entry for the partition, where the partition table entry includes the assigned GUID. In the method 900, the GUID may be implemented using the techniques described herein, such as with respect to FIGS. 4A-4D, for example.

Figure 10:
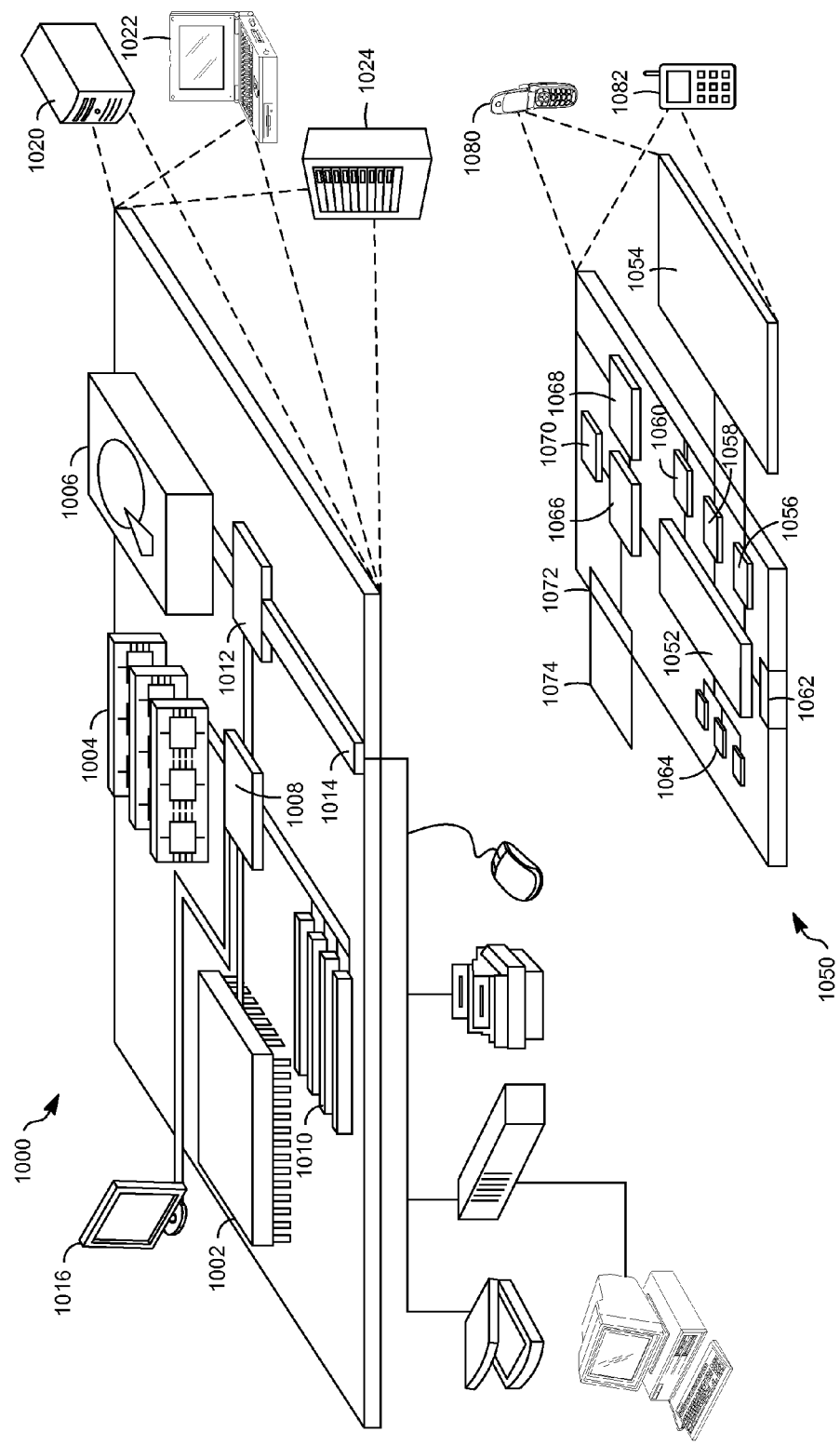
FIG. 10 is a diagram that illustrates a computing device and a mobile computing device that can be used to implement the techniques described herein in accordance with an example embodiment.

FIG. 10 is a diagram that shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1084 may also be provided and connected to device 1050 through expansion interface 1082, which may include, for example, a SIMM (Single In Line Memory Module) card interface. Such expansion memory 1084 may provide extra storage space for device 1050, or may also store applications or other information for device 1050. Specifically, expansion memory 1084 may include instructions to carry out or supplement the processes described above, and may include secure information also. Thus, for example, expansion memory 1084 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1084, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1080 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   loading, by a computing device, an operating system kernel partition (kernel partition);
   identifying, by the computing device, one or more root filesystem (rootfs) partitions that are compatible with the loaded kernel partition, wherein the one or more compatible rootfs partitions are identified by comparing a set of compatibility bits of the loaded kernel partition with respective sets of compatibility bits of a plurality of rootfs partitions of the computing device;
   selecting a rootfs partition from the one or more identified compatible rootfs partitions; and
   loading, by the computing device, the selected rootfs partition.

2. The computer-implemented method of claim 1, wherein each of the respective sets of compatibility bits of the loaded kernel partition and the plurality of rootfs partitions comprises a predefined subset of bits of respective global unique identifiers (GUIDs) of the loaded kernel partition and the plurality of rootfs partitions, wherein locations of the compatibility bits are common for each of the GUIDs.

3. The computer-implemented method of claim 2, wherein each of the sets of compatibility bits comprises one of:
   a set of contiguous bits of the respective GUID; and
   a set of interleaved bits of the respective GUID.

4. The computer-implemented method of claim 2, wherein each of the sets of compatibility bits comprises one of:
   a set of contiguous bits beginning at, and including a most significant bit of the respective GUID;
   a set of contiguous bits ending at, and including a least significant bit of the respective GUID; and
   a set of contiguous bits that does not include the most significant bit or the least significant bit of the respective GUID.

5. The computer-implemented method of claim 1, wherein each of the respective sets of compatibility bits of the loaded kernel partition and the plurality of rootfs partitions are included in respective attribute fields of respective partition table entries for the loaded kernel partition and the plurality of rootfs partitions.

6. The computer-implemented method of claim 1, wherein each of the respective sets of compatibility bits of the loaded kernel partition and the plurality of rootfs partitions are included in respective compatibility bits fields of respective partition table entries for the loaded kernel partition and the plurality of rootfs partitions.

7. The computer-implemented method of claim 1, wherein loading the kernel partition comprises selecting the loaded kernel partition from a plurality of kernel partitions of the computing device.

8. The computer-implemented method of claim 7, wherein each of the plurality of kernel partitions is identified by a respective partition table entry, each respective partition table entry being included in a respective partition table of one or more partition tables of the computing device.

9. The computer-implemented method of claim 7, wherein selecting the loaded kernel partition comprises identifying the loaded kernel partition in firmware of the computing device.

10. The computer-implemented method of claim 7, wherein selecting the loaded kernel partition comprises selecting the loaded kernel partition based on a user selection.

11. The computer-implemented method of claim 1, wherein the loaded kernel partition and the selected rootfs partition are listed non-sequentially in a partition table of a storage device included in the computing device.

12. The computer-implemented method of claim 1, wherein the loaded kernel partition and the selected rootfs partition are respectively located on and listed in respective partition tables of a first storage device included in the computing device and a second storage device included in the computing device.

13. The computer-implemented method of claim 1, further comprising:
   identifying, by the computing device, one or more other partitions that are compatible with the loaded kernel partition by comparing the compatibility bits of the loaded kernel partition with respective compatibility bits of the one or more other partitions;
   selecting at least one of the one or more other partitions; and
   loading, by the computing device, the selected at least one of the one or more other partitions.

14. The computer-implemented method of claim 13, wherein the one or more other partitions comprises at least one of a swap partition, a user state partition and a customization partition.

15. The computer-implemented method of claim 1, wherein selecting the selected rootfs partition comprises selecting a rootfs partition having a highest number of its compatibility bits in common with the compatibility bits of the loaded kernel partition.

16. The computer-implemented method of claim 1, wherein selecting the selected rootfs partition comprises selecting a rootfs partition based on a proximity of a partition table entry for the selected rootfs to a partition table entry for the loaded kernel partition in a corresponding partition table.

17. A computing device comprising:
   a first storage device, the first storage device having a first partition table stored thereon, the first partition table including a plurality of entries, each entry of the first partition table corresponding to a respective partition of the first storage device, each partition table entry of the first partition table including a set of compatibility bits for its respective partition, the respective compatibility bits indicating compatibility relationships between the respective partitions, wherein the compatibility relationships include at least one of:
   a one-to-many relationship between an operating system kernel partition (kernel partition) and a first plurality of root filesystem (rootfs) partitions;
   a many-to-many relationship between a first plurality of kernel partitions and a second plurality of rootfs partitions; and
   a many-to-one relationship between a second plurality of kernel partitions and a rootfs partition.

18. The computing device of claim 17, wherein the compatibility relationships further include at least one of:
   a relationship between one of the kernel partitions and a swap partition;
   a relationship between one of the kernel partitions and a user state partition; and
   a relationship between one of the kernel partitions and a customization partition.

19. The computing device of claim 17, wherein the compatibility bits for each partition are included in a global unique identifier included in each respective partition table entry.

20. The computing device of claim 17, further comprising:
a second storage device, the second storage device having a second partition table stored thereon, the second partition table including a plurality of entries, each entry of the second partition table corresponding to a respective partition of the second storage device, each partition table entry of the second partition table including a set of compatibility bits for its respective partition, the respective compatibility bits of the second partition table indicating at least one of:
a compatibility relationship between a rootfs partition of the second storage device and a kernel partition of the first storage device; and
a compatibility relationship between a kernel partition of the second storage device and a rootfs partition of the first storage device.

21. A computer-implemented method comprising:
receiving, at a partition creator of a computing device, a request to create a partition on a storage device of the computing device;
determining whether the partition is to be compatible with an existing partition group of the computing device;
if the partition is to be compatible with an existing partition group of the computing device, assigning a globally unique identifier (GUID) for the partition that includes a set of compatibility bits corresponding with the existing partition group;
if the partition is not to be compatible with an existing partition group of the computing device, assigning a GUID for the partition that includes a set of compatibility bits that are different than respective compatibility bits for existing partition groups of the computing device;
creating a partition table entry for the partition, the partition table entry including the assigned GUID.

22. The computer-implemented method of claim 21, wherein the request to create the partition is a request to create the partition on one of a first storage device of the computing system and a second storage device of the computing system.

23. The computer-implemented method of claim 21, wherein the request to create the partition is a request to create one of:
an operating system kernel partition;
a root filesystem partition;
a swap partition;
a user state partition; and
a customization partition.

24. A non-transitory recordable storage medium having recorded and stored thereon instructions that, when executed by a computing device, cause the computing device to:
load an operating system kernel partition (kernel partition);
identify one or more root filesystem (rootfs) partitions that are compatible with the loaded kernel partition, wherein the one or more compatible rootfs partitions are identified by comparing a set of compatibility bits of the loaded kernel partition with respective sets of compatibility bits of a plurality of rootfs partitions of the computing device;
select a rootfs partition from the one or more identified compatible rootfs partitions; and
load the selected rootfs partition.

25. The storage medium of claim 24, wherein the instructions, when executed, further cause the computing device to:
identify one or more other partitions that are compatible with the loaded kernel partition by comparing the compatibility bits of the loaded kernel partition with respective compatibility bits of the one or more other partitions;
select at least one of the one or more other partitions; and
load the selected at least one of the one or more other partitions.

26. A non-transitory recordable storage medium having recorded and stored thereon instructions that, when executed by a computing device, cause the computing device to:
receive, at a partition creator of the computing device, a request to create a partition on a storage device of the computing device;
determine whether the partition is to be compatible with an existing partition group of the computing device;
if the partition is to be compatible with an existing partition group of the computing device, assign a globally unique identifier (GUID) for the partition that includes a set of compatibility bits corresponding with the existing partition group;
if the partition is not to be compatible with an existing partition group of the computing device, assign a GUID for the partition that includes a set of compatibility bits that are different than respective compatibility bits for existing partition groups of the computing device;
create a partition table entry for the partition, the partition table entry including the assigned GUID.

\* \* \* \* \*